Aug. 22, 1939.  D. H. KYLE  2,170,476
FISHING APPARATUS
Filed May 6, 1938  2 Sheets-Sheet 1
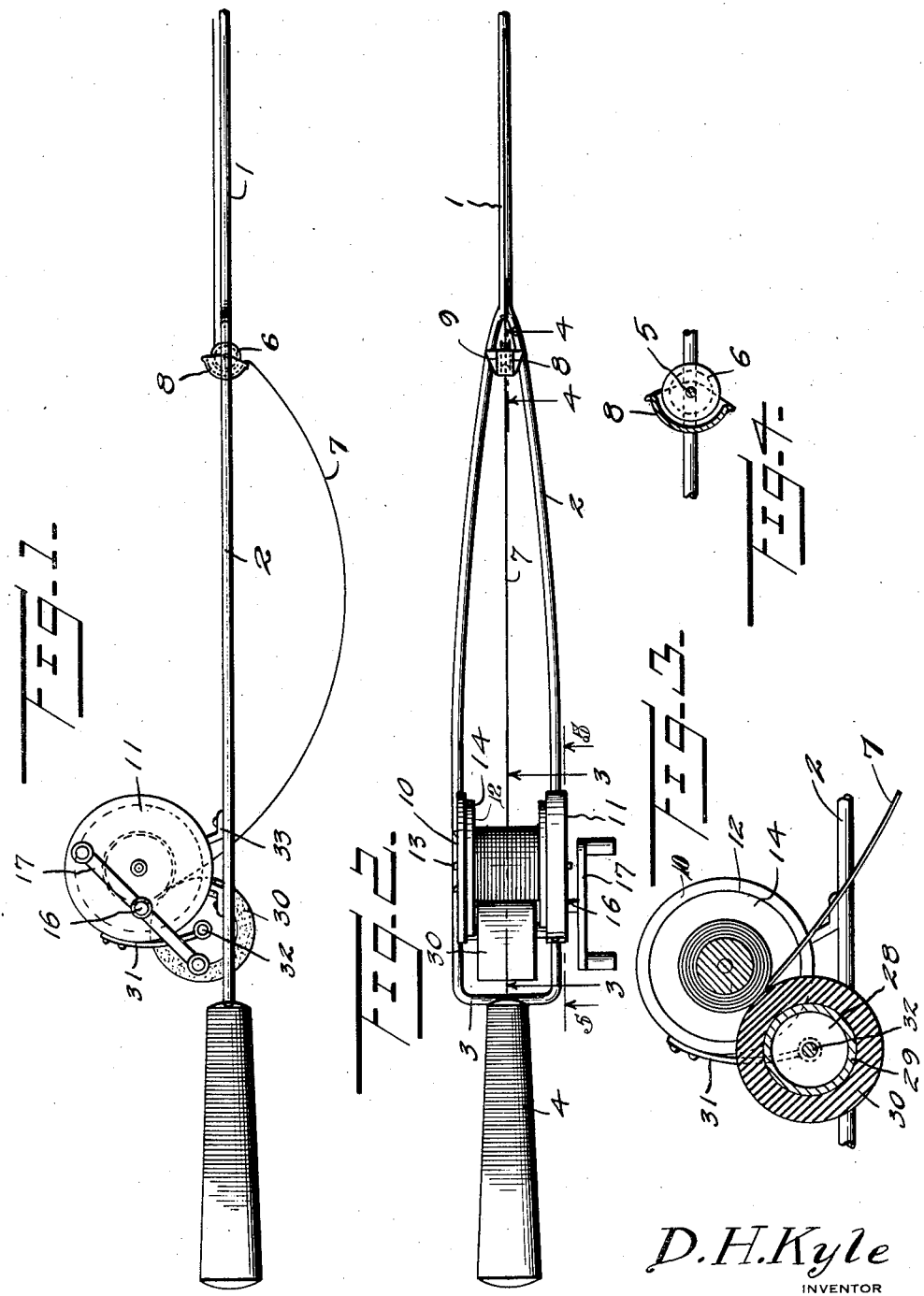
D. H. Kyle
INVENTOR
BY Victor J. Evans & Co.
ATTORNEYS Aug. 22, 1939. D. H. KYLE 2,170,476
FISHING APPARATUS
Filed May 6, 1938 2 Sheets-Sheet 2
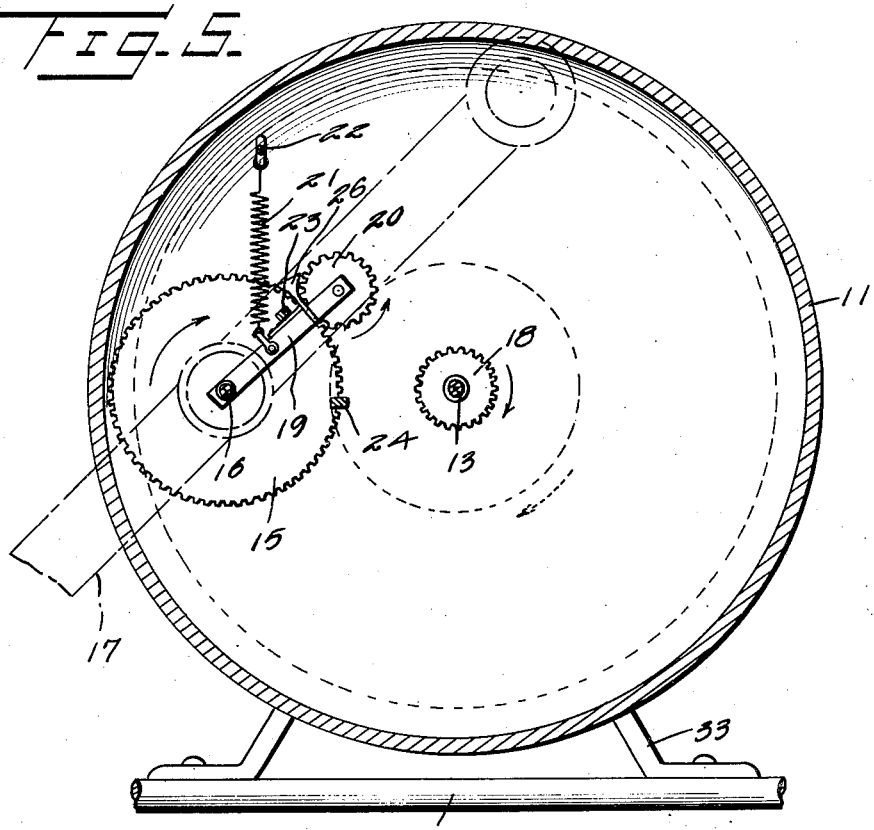
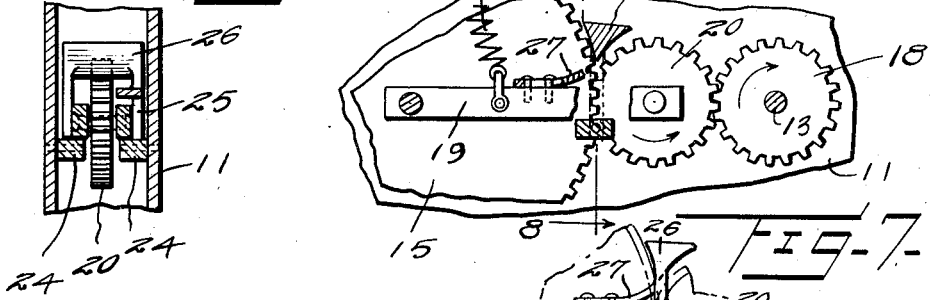
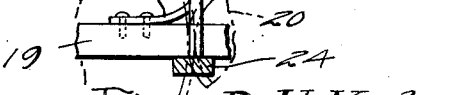
D. H. Kyle INVENTOR
BY Victor J. Evans & Co.
ATTORNEYS Patented Aug. 22, 1939

2,170,476

UNITED STATES PATENT OFFICE 2,170,476

FISHING APPARATUS

Dale H. Kyle, Bryan, Ohio

Application May 6, 1938, Serial No. 206,453

2 Claims. (Cl. 242—84.7)

This invention relates to fishing apparatus, and more particularly to a combined rod, line guide, reel and a backlash snubber for the latter, all of which cooperate with each other to bring about perfect and distant casting, even by a properly instructed novice, with little or no experience, as well as longer casts by experts, than is possible with the conventional equipment, and with minimum effort on the part of either, in that snarling of the line due to overrunning of the spool or other causes, together with backlash and like detrimental features that prevent proper casting, is entirely eliminated.

An important object is to provide a fishing apparatus including a reel that allows free playing off of the line from the lower portion thereof, under the positive control of a snubber, that prevents backlash, overrunning and snarling of the line, and the reel spool is normally retained free or released from the winding means thereof, but the winding means is applied in operative position immediately upon actuation of the winding crank or handle and automatically returns to an inoperative position to release the spool when the handle is released.

A further object is to provide a fishing apparatus of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevation of the fishing apparatus which forms the subject matter of the present invention.

Figure 2 is a top plan view thereof.

Figure 3 is a sectional view taken approximately on line 3—3 of Figure 2, looking in the direction of the arrows.

Figure 4 is a fragmentary view of the pulley guide and line guard therefor.

Figure 5 is an enlarged sectional view taken approximately on line 5—5 of Figure 2, looking in the direction of the arrows.

Figure 6 is a fragmentary view of the winding mechanism of my reel.

Figure 7 is a fragmentary detail view illustrating the gear wedge in its operative position.

Figure 8 is a sectional view taken approximately on line 8—8 of Figure 6, looking in the direction of the arrows.

Referring to the drawings in detail, and particularly to Figures 1 and 2, it will be noted that the respective elements of my fishing apparatus are shown as being permanently fixed in their respective positions, but the reel and its backlash snubber may be detachably secured in position for use. In any event, all the elements of the combination cooperate to bring about perfect and distant casting, as previously set forth.

The rod which is broadly indicated by the reference numeral 1 may be of the sectional type, but the inner section or portion thereof includes an open frame of substantially triangular formation in plan, to provide a pair of arms 2 that are substantially parallel with each other at the rear portions thereof, but the remaining portions of the arms are inclined in converging relation and meet at the outer ends thereof to provide an apex from which extends a rod portion of the usual construction. The rear ends of the arms 2 are bridged by a base member 3 having formed thereon or otherwise secured thereto a handle 4 extending centrally from the bridging member, as best shown in Figure 2.

Secured to and bridging the arms adjacent to the apex portion thereof, is a shaft 5 having a pulley 6 rotatably mounted thereon, and which provides the rear line guide, as shown, the line being indicated by the reference numeral 7 and is disposed over the pulley and is held associated therewith by a guard 8. The guard is shown as being in the form of a channel member of substantially semi-circular formation, with closed side portions disposed upon opposite sides of the pulley 6 and extending in ears 9 fixed to the arms 2, as shown in Figure 2. However, the guard may have open frame side portions.

In any event, the line is trained over the pulley 6, from its running loop, as clearly shown in Figure 1, and it might be mentioned here that the stationary line guide now in general use, has been a focal point of high resistance, because the running loop of the line is thrown upward by centrifugal force from the top of the spool and the upthrust is opposed by gravity causing a continued whipping action in the running loop, as it passes through the rear guide, but by employing a pulley, the resistance has been reduced to a minimum and the whipping action eliminated. Again, the triangular frame of the rod allows for the free passage of the running loop of the line therethrough, to eliminate any engagement of the line with the rod between the pulley and the reel.

My improved reel includes end members 10 and 11, the end member 10 being of the usual disk form, while the end member 11 provides a casing for the winding mechanism. The spool 12 is journaled between the end members through the instrumentality of trunnions 13, and it will be noted that the spool is provided with disk end members 14 having flat inner faces, as distinguished from the substantially conical inner faces of the end members of the conventional spool.

Rotatably mounted in the casing end member 11 is a relatively large gear 15 that is fixed to its shaft 16 and the shaft has also fixed thereto a handle 17 of the usual crank formation, as best shown in Figure 1. The shaft 16 is of course journaled in the casing and extends through the same with the handle mounted on the outer end thereof. Secured to the trunnion of the spool that extends into the casing, is a relatively small gear 18, and carried by arms 19 mounted on the shaft 16 for oscillation is a gear 20 that is held in constant mesh with the gear 15, but is movable into and out of mesh with the gear 18, when the handle is actuated and released, as will be apparent upon inspection of Figure 5. The gear 20 is of course rotatably mounted between the arms 19, and is normally held out of mesh with the gear 18 by a coil spring 21 that has its end convolutions connected to one of the arms 19 and a stud 22 secured to and bridging the walls of the casing.

The upward movement of the arms 19 for the gear 20 is limited by a stop 23 fixed to the outer casing wall for disposal in the path of the outer arm 19 and stops 24 fixed to the casing walls, as shown in Figure 8, are also provided for disposal in the path of the depending arms 25 of a wedge block 26 which is seated between the gears 15 and 20 for engagement therewith, so that upon forward movement of the handle, the gear 20 will be lowered in mesh with the gear 18. Immediately upon the gear 20 meshing with the gear 18, the wedge block is disposed out of engagement with the gears 15 and 20, due to the contact of the depending arms 25 with the stops 24, consequently it will be seen that the spool 12 of the reel is normally free, but upon actuation of the handle 17, the gear 20 is lowered to mesh with the gear 18, to cause manual rotation of the spool, and when the handle is released, the gear 20 automatically returns to its normal position.

The wedge block is connected to one of the arms 19 by a spring finger 27 which normally holds the wedge block in engagement with the gears 15 and 20.

It will also be seen that upon moving the handle 17 in a clockwise direction, the gear 15 will be rotated accordingly, to rotate the gear 20 in an opposite direction, and the gear 20 rotates the gear 18 in a clockwise direction, for rotating the spool accordingly.

My improved backlash snubber includes a roller made up of a core 28 having secured thereto a collar 29 preferably of metal, and surrounding the collar 29 is a collar 30 formed from rubber or other pliable material, for engagement with the windings of the line on the spool.

The roller is of a width to fit between the flat inner faces of the disk end members 14 of the spool as best shown in Figure 2, and the fitting association of the roller with the faces, prevents the line from passing about the ends of the roller, as will be apparent.

The roller is held engaged with the windings of the spool, through the instrumentality of a pair of spring arms 31 which are fixed to the end members 10 and 11 at one end, and the opposite ends are connected with the spindle 32 of the roller. It will be noted that the roller is associated with the reel in a manner to be disposed rearwardly and below the spool, and that arrangement allows for proper thumbing of the reel, as will be apparent.

The reel is shown as being fixed to the arms 2 by attaching brackets 33, of a length to space the reel a considerable distance above the arms, but in convenient reach of the thumb of the user when gripping the handle 4, and it will be noted that as best shown in Figures 1 and 3, the line 7 is played off the spool at the lower portion thereof, so that the running loop is directed downwardly. That feature coupled with the pulley and the arrangement of the snubber and the open frame portion of the rod brings about proper and distant casting with minimum effort and skill on the part of the user.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a fishing apparatus, a reel including end members, a spool journaled between the end members, a shaft rotatably mounted in one of said end members, a gear fixed to the shaft, a gear secured to the spool, an intermediate gear, means carrying the intermediate gear and mounted on the shaft, said carrying means holding an intermediate gear in constant mesh with the first gear and for moving the intermediate gear into and out of engagement with the second gear, spring means connected to the gear carrying means for normally holding the intermediate gear out of mesh with the second gear to allow free movement of the spool, wedge means normally engaged with the first gear and intermediate gear to prevent rotation thereof, a handle secured to the shaft and cooperating with the wedge means for moving the intermediate gear into mesh with the second gear upon rotation of the handle for manually rotating the spool, and means for releasing the wedge means from the gears when the intermediate gear is meshed with the second gear.

2. In a fishing apparatus, a reel including end members and one of said members providing a casing, a spool journaled between the end members, a shaft rotatably mounted in said casing, a gear fixed to the shaft, a gear within the casing and secured to the spool, an intermediate gear, means carrying the intermediate gear and mounted on the shaft, said carrying means holding the intermediate gear in constant mesh with the first gear and for moving the intermediate gear into and out of mesh with the second gear, spring means connected to the gear carrying means for normally holding the intermediate gear out of mesh with the second gear to allow free movement of the spool, wedge means resiliently secured to said carrying means and normally engaged with the first gear and the intermediate gear to prevent rotation thereof, arms depending from the wedge means, a handle secured to the shaft for moving the intermediate gear into mesh with the second gear upon rotation of the handle for manually rotating the spool, and stop means arranged in the path of the arms to release the wedge means from the gears when the intermediate gear is meshed with the second gear.

DALE H. KYLE.